INVENTOR
Donald E. Meitzler
Charles A Warren
ATTORNEY

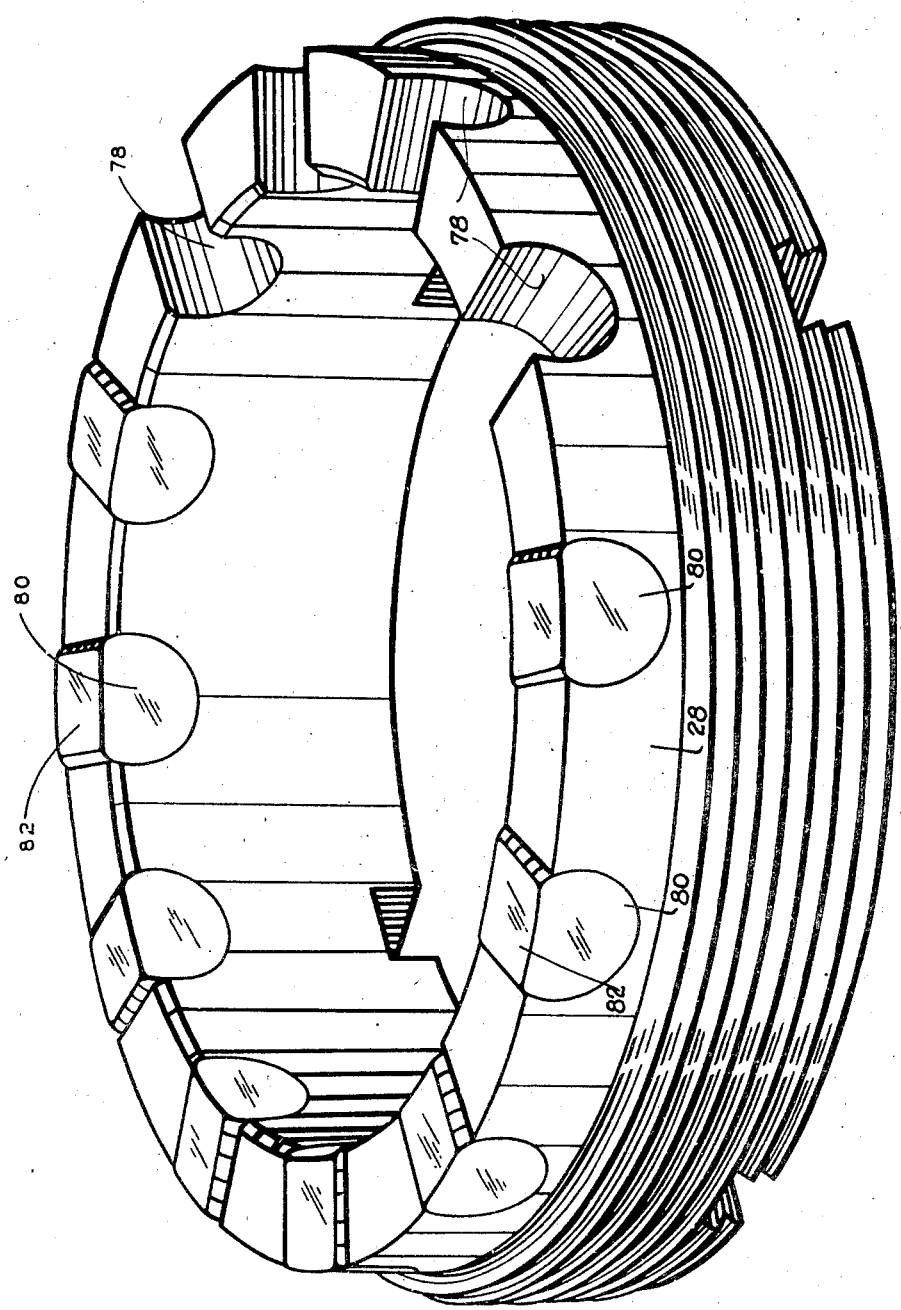

Patented Jan. 14, 1947

2,414,267

UNITED STATES PATENT OFFICE 2,414,267

INJECTION SYSTEM

Donald E. Meitzler, Manchester, Conn., assignor to United Aircraft Corporation, East Hartford, Conn., a corporation of Delaware Application January 28, 1944, Serial No. 520,069

12 Claims. (Cl. 103—154)

This invention relates to a fuel injection device in which the injection plunger is driven by an oscillating member.

An injection device actuated from a reciprocating rod extended at right angles to the injection plunger is described in the copending Meitzler application, Serial No. 486,625, filed May 11, 1943. In this application the reciprocating rack drives a sleeve which surrounds the injection plunger and has a helix which causes the injection plunger to reciprocate. This sleeve, which, during the injection stroke of the plunger, is subject to a heavy end thrust, must be held in place by a thrust ring. A feature of this invention is the use of rocking shoe bearings between the sleeve and the thrust ring, thereby permitting heavier loads without bearing failure.

Another feature of the invention is the use of a number of rocking shoe bearings arranged for simultaneous engagement with the helix, to transmit the high loads developed during the reciprocation of the injection plunger.

Other objects and advantages will be apparent from the specification and claims and from the accompanying drawings which illustrate an embodiment of the invention.

Fig. 3 is a perspective view of the thrust ring with the rocking shoe bearings in position.

Figure 1:
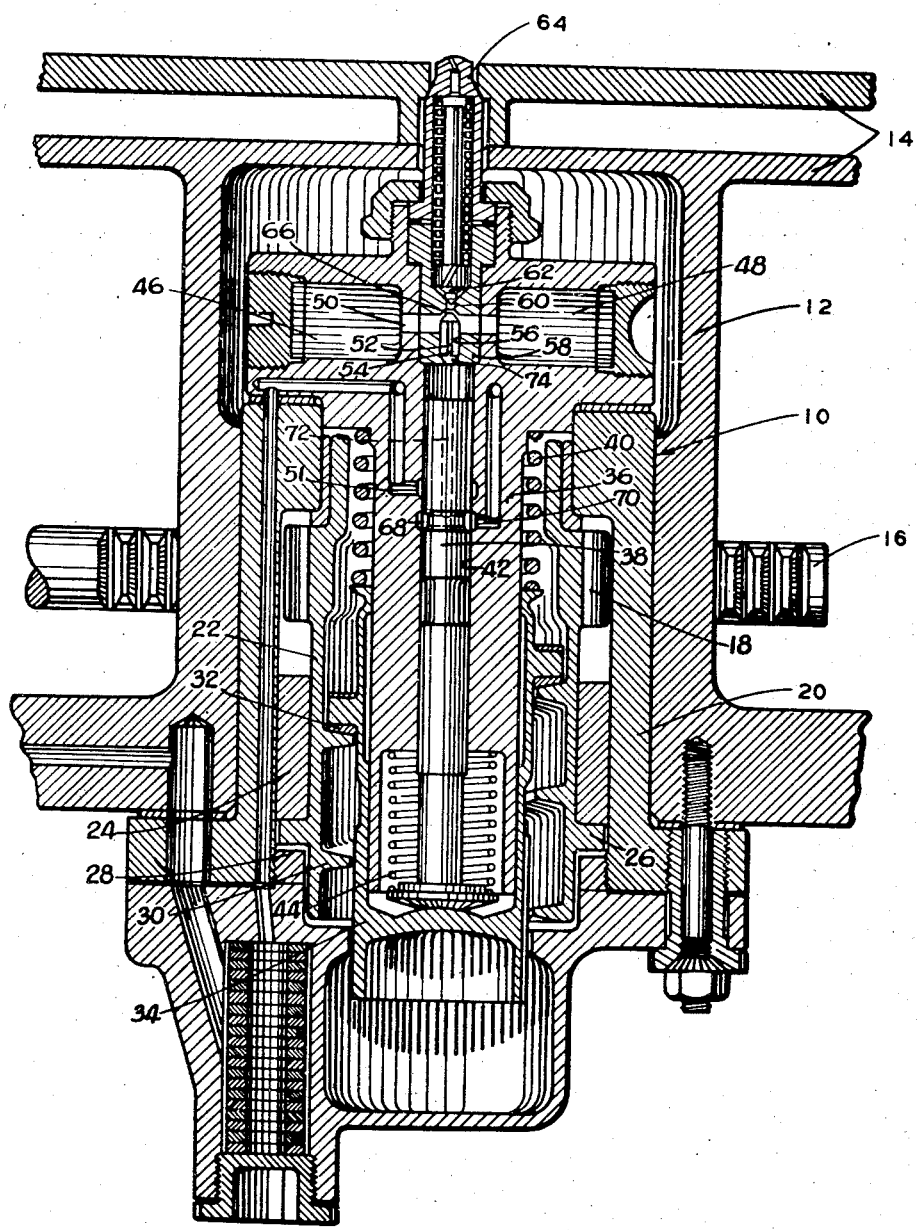
Fig. 1 is a sectional view through the injection device.

The injection device 10 is supported within a tubular bracket 12 which may be integral with a part of the wall of an engine cylinder 14. The injection device is actuated by a rod 16 in the form of a reciprocating rack. The rack engages a pinion 18 which is supported in a housing 20 forming part of the injection device. The pinion is integral with a sleeve 22 journaled in the housing and supported by a bearing ring 24. A radial flange 26 on the sleeve is held between the end of bearing ring 24 and a thrust ring 28 to prevent endwise movement of the pinion.

The inner surface of sleeve 22 has a helix 30 engaging shoes 32 on a thrust cup 34. This is positioned over a casing 36 in which an injection plunger 38 is slidable. A coil spring 40 urges cup 34 axially to hold the shoes in contact with the helix. As pinion 18 is reciprocated by rack 16, plunger 38 is moved axially in its bore 42, the end of the plunger being held against cup 34 by a coil spring 44.

The injection system may be the accumulator type. Casing 36 may have opposed accumulator chambers 46 and 48 interconnected by a passage 50. Fuel which enters the end of bore 42 through an inlet port 51 is pumped into the chambers through a groove 52 in an accumulator valve 54 which slides in a bore 56 in a ring 58 in casing 36. Fuel discharges from the accumulator chambers through a passage 60 and past a check valve 62 to the nozzle 64. The accumulator valve 54 moves endwise to engage a seat 66 at the end of passage 60 during filling of the accumulator chambers, being held on this seat by pressure of fuel on the other end of the valve. Injection occurs when a groove 68 in plunger 38 uncovers a vent port 70. This groove is connected to the end of the plunger 38 by a passage 72 in the plunger and causes a drop in pressure in bore 42 when port 70 is uncovered. This drop in pressure causes valve 54 to move against a seat 74 in the ring 58 in casing 36, closing groove 52 and opening passage 60 for injection of fuel from the chambers. This injection device is fully described in the copending Meitzler application, Serial No. 486,625, above mentioned.

Figure 2:
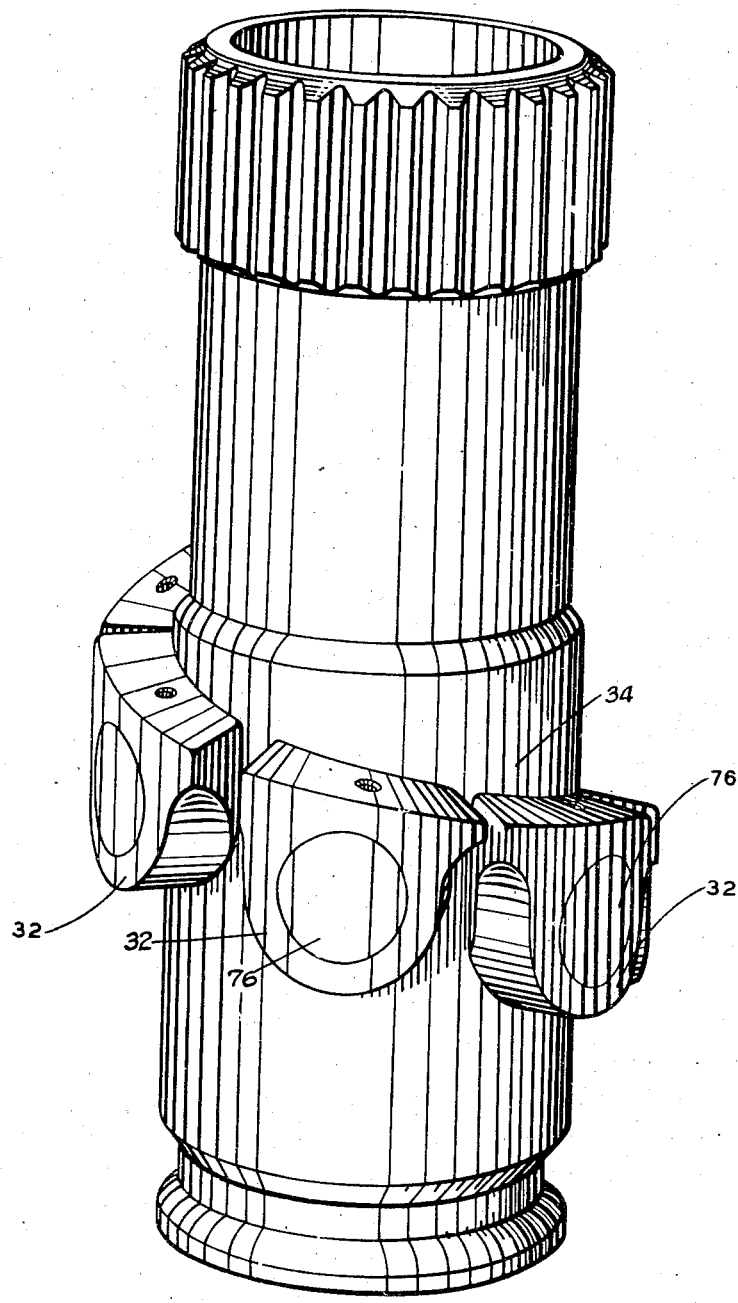
Fig. 2 is a perspective view of the thrust cup with the rocking shoe bearings in position, the cup being inverted.

The bearing shoes 32 which engage helix 30 are in the form of rocking shoes mounted to rock on pins 76 extending from thrust cup 34 and arranged in a helix around the cup so that the bearing surface of all of the shoes may engage the helix simultaneously. Each rocking shoe, as shown in Fig. 2, may be constructed so that the leading edge, during the injection stroke, is farther from the line of thrust through the center of oscillation than is the trailing edge. In this way, the bearing shoe, in moving on the helix, will develop a force on the shoe to move it into a position to provide the most effective wedge-shape lubricating film during the injection stroke of the plunger. Each shoe, during the retraction of the plunger, may rock to provide a wedge-shaped film of oil for effective lubrication on the return stroke. The bearing is long enough to assure the desired tipping of the shoe for providing the proper wedge angle.

To enable the thrust ring 28 to carry the heavy end thrust on the sleeve 22 during the injection stroke, this ring has a number of circular recesses 78, Fig. 3, extending radially to receive cylindrical bearing elements 80 forming rocking bearing shoes having flat surfaces 82 engaging with the radial flange 26. Since bearing elements 80 are cylindrical, each element is adapted to rock in the thrust ring to permit the bearing surface 82 to extend at the desired angle to the surface of the flange for satisfactory lubrication during movement between this flange 26 and the bearing surface. Each element 80 will be large enough to provide a bearing surface 82 to assure the desired tipping of the shoe for providing the proper wedge angle.

It is to be understood that the invention is not limited to the specific embodiment herein illustrated and described, but may be used in other ways without departure from its spirit as defined by the following claims.

I claim:

1. An injection pump including a plunger, a casing in which the plunger reciprocates, an oscillating member surrounding the plunger, means interconnecting the member and plunger for causing reciprocation of the plunger in response to oscillation of the member, and bearing means in the form of rocking shoes forming a part of the interconnecting means between said member and the plunger.

2. An injection pump including a plunger, a casing in which the plunger reciprocates, an oscillating member having its axis parallel to the plunger, means interconnecting said member and plunger for causing reciprocation of the plunger in response to oscillation of the member, and bearing means in the form of rocking shoes forming a part of the interconnecting means between said member and the plunger.

3. An injection pump including a plunger, a casing in which the plunger reciprocates, an oscillating member surrounding the plunger, means interconnecting said member and plunger for causing reciprocation of the plunger in response to oscillation of the member, and having a cam thereon, said member bearing means in the form of rocking shoes forming a part of said means and engaging said cam.

4. An injection pump including a plunger, a casing in which the plunger reciprocates, an oscillating member surrounding the plunger, means interconnecting said member and plunger for causing reciprocation of the plunger in response to oscillation of the member, and bearing means in the form of rocking shoes forming a part of said interconnecting means.

5. An injection pump including a plunger, a casing in which the plunger reciprocates, an oscillating member surrounding the plunger, means interconnecting said member and plunger for causing reciprocation of the plunger in response to oscillation of the member, bearing means forming a part of the interconnection between said member and plunger, and bearing means for holding said member in position, one of said bearing means including a rocking shoe.

6. An injection pump including a plunger, a casing in which the plunger reciprocates, as oscillating member surrounding the plunger, means interconnecting said member and plunger for causing reciprocation of the plunger in response to oscillation of the member, bearing means forming a part of the interconnection between said member and plunger, and bearing means for holding said member in position, one of said bearing means including a set of rocking shoes engaging said member.

7. An injection pump including a plunger, a casing in which the plunger reciprocates, an oscillating member surrounding the plunger, means interconnecting said member and plunger for causing reciprocation of the plunger in response to oscillation of the member, bearing means forming a part of the interconnection between said member and plunger, and bearing means for holding said member in position, each of said bearing means including a set of bearing shoes engaging said member.

8. An injection pump including a plunger, a casing in which the plunger reciprocates, an oscillating member surrounding and causing reciprocation of the plunger, and having a helix thereon, a thrust cup surrounding and engaging the plunger, and a set of rocking shoes arranged in a helix on the cup and engaging the helix on the oscillating member.

9. An injection pump including a plunger, a casing in which the plunger reciprocates, an oscillating member surrounding and causing reciprocation of the plunger and having a helix thereon, a thrust cup surrounding and engaging the plunger, and a set of rocking shoes arranged in a helix on the cup and engaging the helix on the oscillating member, each shoe having its leading edge, on the pumping stroke, farther from the line of thrust through the center of the bearing oscillation than is the trailing edge.

10. An injection pump including a plunger, a casing in which the plunger reciprocates, an oscillating member surrounding the plunger, means connecting said member and plunger and causing reciprocation of said plunger in response to oscillation of said member, and bearing means in the form of rocking shoes for holding the member in position.

11. An injection pump including a plunger, a casing in which the plunger reciprocates, an oscillating member surrounding the plunger, means connecting said member and plunger and causing reciprocation of said plunger in response to oscillation of said member, a housing in which the member is positioned, a thrust ring in the housing for holding the member in position, and a number of rocking shoes between the ring and member and forming a bearing.

12. An injection pump including a plunger, a casing in which the plunger reciprocates, an oscillating member surrounding the plunger, means connecting said member and plunger and causing reciprocation of said plunger in response to oscillation of said member, a housing in which the member is positioned, a thrust ring in the housing for holding the member in position, and a number of rocking shoes between the ring and member, said shoes fitting in radially extending recesses in the ring.

DONALD E. MEITZLER.

Certificate of Correction

Patent No. 2,414,267. January 14, 1947.

DONALD E. MEITZLER

It is hereby certified that errors appear in the printed specification of the above numbered patent requiring correction as follows: Column 3, line 35, claim 3, for "and having" read *said member having*; line 36, same claim, for "said member" read *and*; and that the said Letters Patent should be read with these corrections therein that the same may conform to the record of the case in the Patent Office.

Signed and sealed this 8th day of April, A. D. 1947.

[SEAL]

LESLIE FRAZER,
*First Assistant Commissioner of Patents.*